US007577848B2

(12) United States Patent
Schwartz et al.

(10) Patent No.: US 7,577,848 B2
(45) Date of Patent: Aug. 18, 2009

(54) SYSTEMS AND METHODS FOR VALIDATING EXECUTABLE FILE INTEGRITY USING PARTIAL IMAGE HASHES

(75) Inventors: Jonathan D. Schwartz, Kirkland, WA (US); Yu Lin Sie, Bellevue, WA (US); Philip Joseph Hallin, Port Townsend, WA (US)

(73) Assignee: Microsoft Corporation, Redmond, WA (US)

( * ) Notice: Subject to any disclaimer, the term of this patent is extended or adjusted under 35 U.S.C. 154(b) by 899 days.

(21) Appl. No.: 11/037,566

(22) Filed: Jan. 18, 2005

(65) Prior Publication Data
US 2006/0161761 A1 Jul. 20, 2006

(51) Int. Cl.
*G06F 11/30* (2006.01)
(52) U.S. Cl. ........................ 713/187; 713/165; 713/168; 713/176; 713/188; 726/24; 711/216; 717/126; 717/168; 717/169; 717/172; 717/173; 717/174; 717/175; 717/177; 717/178
(58) Field of Classification Search .................. 713/165, 713/168, 176, 187, 188; 726/24; 711/216; 717/126, 169, 172, 175, 177, 178
See application file for complete search history.

(56) References Cited

U.S. PATENT DOCUMENTS

| 5,757,919 | A | 5/1998 | Herbert et al. | |
|---|---|---|---|---|
| 5,892,904 | A | 4/1999 | Atkinson et al. | |
| 6,961,852 | B2* | 11/2005 | Craft | 713/168 |
| 7,103,779 | B2* | 9/2006 | Kiehtreiber et al. | 713/187 |
| 7,490,352 | B2* | 2/2009 | Kramer et al. | 726/22 |
| 2004/0107416 | A1* | 6/2004 | Buban et al. | 717/170 |
| 2004/0162989 | A1 | 8/2004 | Kirovski | |
| 2005/0188214 | A1* | 8/2005 | Worley et al. | 713/187 |
| 2005/0251677 | A1* | 11/2005 | Maeda et al. | 713/165 |
| 2006/0015731 | A1* | 1/2006 | Lakshmi Narayanan | 713/176 |
| 2006/0031407 | A1* | 2/2006 | Dispensa et al. | 709/219 |
| 2006/0185017 | A1* | 8/2006 | Challener et al. | 726/24 |

FOREIGN PATENT DOCUMENTS

EP 0752786 1/1997

OTHER PUBLICATIONS

Microsoft Cabinet module, http://svn.navi.cx/gnupdate/branches/libcomprex/glib-rewrite/modules/archive/cab/cab.h, copyright © 1999-2004 The GNUpdate Project.*
EPO Communication with Search Report dated May 2006, from counterpart EP patent application, European Patent Application No. 05112610.0, 3 pages.

* cited by examiner

*Primary Examiner*—Beemnet W Dada
*Assistant Examiner*—April Y Shan
(74) *Attorney, Agent, or Firm*—Lee & Hayes, PLLC

(57) ABSTRACT

Systems and methods for validating integrity of an executable file are described. In one aspect, multiple partial image hashes are generated, the combination of which represent a digest of an entire executable file. Subsequent to loading the executable file on a computing device, a request to page a portion of the executable file into memory for execution is intercepted. Responsive to intercepting the request, and prior to paging the portion into memory for execution, a validation hash of the portion is computed. The validation hash is compared to a partial hash of the multiple partial image hashes to determine code integrity of the portion. The partial hash represents a same code segment as the portion.

17 Claims, 3 Drawing Sheets

SYSTEMS AND METHODS FOR VALIDATING EXECUTABLE FILE INTEGRITY USING PARTIAL IMAGE HASHES

TECHNICAL FIELD

This disclosure relates to data authentication or verification.

BACKGROUND

An executable file run on a user's computer may contain a virus or a Trojan horse. An executable file is also called a binary image and includes, for example, any executable object such as portable executables (PEs), macros, scripts like Visual Basic script (VBS), etc. A virus is a program or piece of code that modifies a binary image on disk, typically against the user's wishes and without the user's knowledge. Viruses can also replicate themselves. A simple virus that can make a copy of itself over and over again is relatively easy to produce. Even such simple viruses are dangerous because they may quickly use all available memory and bring a system to a halt. Other dangerous types of viruses are capable of transmitting themselves across networks and bypassing security systems. Unlike viruses, Trojan horses do not replicate themselves but they can be just as destructive, often masquerading themselves as benign applications. For instance, a Trojan horse may be independently launched by an unsuspecting user. An insidious type of Trojan horse is a program that claims to rid your computer of viruses but instead introduces viruses onto your computer. Thus, executable files can be risky to run on a computer.

One approach to identify executable code that has been corrupted, for example, with a virus or a Trojan horse, involves the use of trusted cryptographic hashes when installing or downloading an executable onto a computing device. A cryptographic hash, or simply a "hash", compiles an executable into a summarized form, or digest. A trusted hash is known to be good, or represent uncorrupted code, at the time of the hashes' creation. To generate trusted hashes for a an executable file (i.e., a binary image, executable code, scripts, macros, etc.), a message digest or checksum calculation is performed on the executable, including associated resources such as data, to obtain a first result before transferring the executable from one location to another. The same calculation is made on the transferred executable to obtain a second result. The first result is compared to the second result to determine if the received executable is the same data that was originally sent. For instance, if the before and after calculation results match, then the received data is likely accurate. Otherwise, the received executable has been corrupted. In this manner, use of a full binary image hash effectively reduces the risk of downloading or installing a corrupted binary image.

SUMMARY

Systems and methods for validating integrity of an executable file using partial image hashes are described. In one aspect, multiple partial image hashes are generated, the combination of which represent a digest of an entire binary image. Subsequent to loading the binary image on a computing device, a request to page a portion of the binary image into memory for execution is intercepted. Responsive to intercepting the request, and prior to paging the portion into memory for execution, a validation hash of the portion is computed. The validation hash is compared to a partial hash of the multiple partial image hashes to determine code integrity of the portion. The partial hash represents a same code segment as the portion.

BRIEF DESCRIPTION OF THE DRAWINGS

In the Figures, the left-most digit of a component reference number identifies the particular Figure in which the component first appears.

DETAILED DESCRIPTION

Overview

Figure 1:
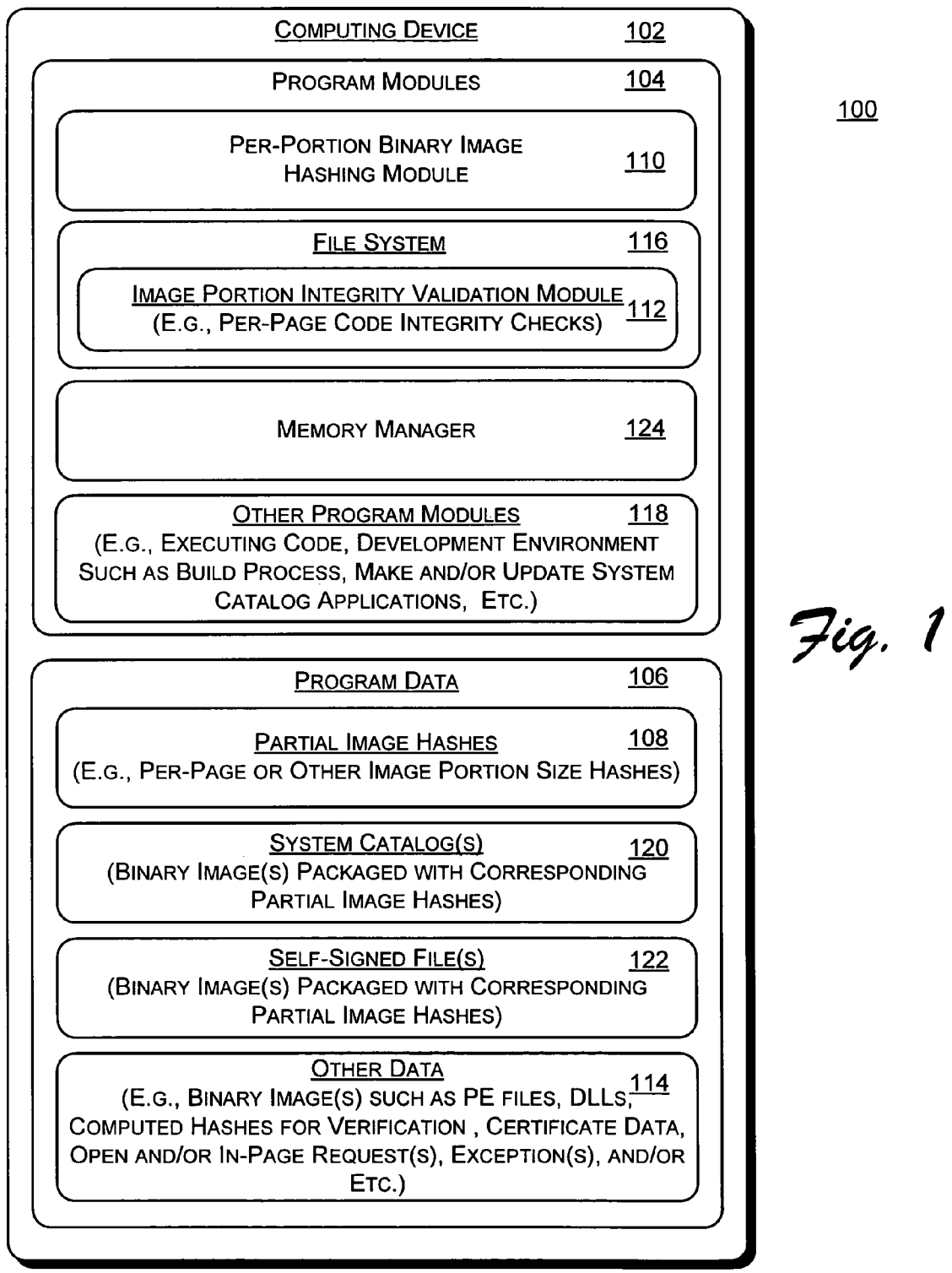
FIG. 1 illustrates an exemplary system to validate executable file integrity using partial hashes.

Mapping only a portion of executable code into memory at any one time prior to executing the code is commonly performed to efficiently utilize processing and memory resources. For example, paging is a technique used by virtual memory operating systems to load/map, at any one time, only a certain number of bytes from an executable file (e.g., a PE file) from a storage device into memory as code. For instance, when a computer-program needs a page that is not in main memory, the operating system copies the required page into memory. In another example, a script engine such as a VB script engine may map a portion of script (the portion being independent of any page or page size concept) from a storage device into memory as code.

In view of the different techniques used to load different types and amounts of executable code into memory for execution, and for purposes of discussion, the phrase "a portion" hereinafter indicates an arbitrary number of bytes, wherein the number of bytes is appropriate to the particular code-to-memory loading operation being performed. For example, for paging operations, the phrase "a portion", or "portion" refers to a number of bytes delineated by a page boundary (one or more pages). In another example, and with respect to non-paging operations (e.g., executable code memory loading operations performed by a scripting engine), the phrase "a portion", or "portion" refers to a number of bytes appropriate to the particular implementation used to move code/script into memory for subsequent execution. Regardless of what techniques is used to load executable code into memory for execution, the number of bytes in such a portion is arbitrary and generally a lesser number of bytes than the number of bytes in a complete executable file, typically being a function of the particular executable code loading architecture being implemented.

One reason why the byte size of a portion of executable code for loading into memory is typically less than full executable file size is because of the prohibitive amounts of memory and processing resources that would generally be required to load the full executable file into memory, especially when only a small portion (e.g., one or more pages) of the executable file is scheduled for execution. For instance, after an executable file is installed onto a data storage device, if a single hash of the entire image (executable file) was to be validated immediately prior to loading the first portion of that image into memory for execution, memory and processor resources would not be efficiently utilized. This is because calculating the full-image hash would require paging the entire executable file into memory.

Such a process requires paging in pieces of code, data, and/or resources that, under normal paging operation circumstances, would not be paged in at that particular time, if ever. Again, such portion loading operations would be substantially prohibitive in terms of resource and performance costs. For these reasons, using a full-image hash is not practical when mapping a portion of code into memory for execution to determine if code associated with the portion has been corrupted. Accordingly, executable code loading architectures typically load much less than a full executable file into memory for execution. This ensures that that memory and processing resources are efficiently used.

In view of the above, when a portion of an executable file is being paged into memory, if the portion was corrupted since the last full executable file hash integrity check was made, existing systems will not detect the corrupted code until after the corrupted code is executed, if at all. By this time, the corrupted code has likely compromised the integrity of one or more parts of the system. In other words, any existing system that implements full-image integrity checks can run into problems if the page is corrupted after the check. For these reasons, executable files are still very risky to run.

In contrast to conventional code integrity infrastructures, the following described systems and methods for validating executable file integrity use partial hashes to detect any code that has been corrupted after it was installed on the system immediately prior to moving (paging, etc.) the code into memory for execution. The systems and methods accomplish this without relying on the full-image hash infrastructure of conventional systems. To this end, the systems and methods generate multiple hashes for each executable file. Each individual hash represents a respective portion of the executable file, such that each hash is a digest of less than all of the bytes of the executable file. In this implementation, for example, each hash is a digest of a respective page of the executable file—i.e., a per-page hash. (The number of bytes in a page is arbitrary and a function of the particular implemented paging architecture). In another implementation, each hash is not a per-page hash, but represents a digest of less than a page or more than a page of the executable file.

As the systems and methods load a portion (e.g., a page or otherwise) of the executable file into memory from a storage device, the systems and methods check the integrity of only that portion. This results in very little resource or performance impact, since the portion is validated without loading any additional/extraneous portions of the executable file (e.g., the entire executable file).

When the systems and methods for validating executable file integrity using partial hashes identify a corrupt portion of an executable being loaded into memory, for example, as part of an in-page operation, the corrupt portion is not mapped into memory for execution. In one implementation, when a corrupt portion of an executable is identified during paging operations, the corresponding in-page operation is failed, which in some implementations will cause an exception to be thrown. In this manner, the systems and methods detect corrupt pages of code before the code can be executed. This substantially reduces the risks of executing an executable file, and thereby provides additional protection against viruses, Trojan attacks, and/or the like, involving executable files.

These and other aspects of the systems and methods for validating executable file integrity using partial hashes are now described in greater detail.

An Exemplary System

Although not required, the systems and methods for validating executable file integrity using partial hashes are described in the general context of computer-executable instructions (program modules) being executed by a computing device such as a personal computer. Program modules generally include routines, programs, objects, components, data structures, etc., that perform particular tasks or implement particular abstract data types. While the systems and methods are described in the foregoing context, acts and operations described hereinafter may also be implemented in hardware.

FIG. 1 illustrates an exemplary system 100 for validating executable file integrity using partial hashes. In this implementation, system 100 includes client computing device 102. Computing device 102 is any type of computing device such as a personal computer, a laptop, a server, small form factor mobile computing device (e.g., a cellular phone, personal digital assistant, or handheld computer), etc. Computing device 102 includes program modules 104 and program data 106. Program modules 102 include, for example, one or more computer-program modules to generate multiple cryptographic hashes (i.e., partial image hashes 108) for respective portions of an executable file, and program modules to validate the executable file with respective ones of the multiple cryptographic hashes during code paging (or portion loading) operations. For instance, per-portion executable file hashing module 110 generates partial image hashes 108 for respective portions of an executable file. Image portion integrity validation module 112, which in this implementation is a file system plug-in (e.g., a filter driver), validates the executable file using the generated cryptographic hashes during code paging operations. For purposes of illustration, executable file(s) for cryptographic hashing to generate partial image hashes 108 are shown as a respective part of "other data" 114.

For purposes of discussion and illustration, per-portion executable file hashing module 110 and image portion integrity validation module 112 are shown as being implemented on single computing device 102. However, these program modules may be implemented on different computing devices with all or a subset of the program modules 104 and the program data 106 of computing device 102. For example, in one implementation, a first computing device implements executable file hashing module 110 to generate a package comprising an executable file and corresponding partial image hashes 108 for installation and/or download onto a second computing device. A second computing device implements image portion integrity validation module 112 to validate the executable file with respective ones of the multiple cryptographic hashes during code paging (or portion loading) operations.

We now describe the operations of system 100 in greater detail by first describing exemplary operations of per-portion executable file hashing module 110 and then describing exemplary operations of image portion integrity validation module 112.

Exemplary Per-Portion Executable File Cryptographic Hashing

As indicated above, per-portion executable file hashing module 110 generates partial image hashes 108 for respective portions of an executable file. Each partial hash 108 of the partial image hashes 108 represents a hash of a respective portion of an executable file, such that each hash 108 is a digest of less than all of the bytes of the executable file (unless the size of the entire executable is less than or equal to the portion size). In one implementation, for example, each hash 108 is not a per-page hash, but represents a digest of less than a page, or more than a page, of the executable file (i.e., a digest that is not based on a page size boundary). In this implementation, and for purposes of discussion, each hash 108 is a digest of a respective page of the executable file—i.e., a per-page hash. (The number of bytes in a page is arbitrary and a function of the particular implemented paging architecture). The particular hashing algorithm(s) implemented by per-portion executable file hashing module 110 to create the multiple partial hashes 108 is arbitrary and can be any algorithm used to generate a hash of binary code. Examples of such algorithms include, for example, SHA-1 and MD5.

System 100 can associate an executable file with its corresponding partial image hashes 108 in many different ways. In one implementation, for example, system 100 utilizes a make or update system catalog application (see, "other program modules" 118) to package an executable file with its corresponding partial image hashes 108 into a system catalog 120. Such packaging may be performed as part of system catalog 120 creation operations, or as part of a system catalog 120 updating process. In one implementation, the system catalog 120 is based on a cabinet file structure that also includes partial image hashes 108. Although system catalog use is common, a conventional system catalog does not include partial image hashes 108 of any executable file. Rather, if a conventional system catalog includes any type of executable file hash, the executable file hash will be a single executable file hash for the entire executable file. In one implementation, system catalog 120 includes partial image hashes 108 and a full executable file hash; the full executable file hash being for backward compatibility with conventional code integrity infrastructure.

In another implementation, system 100 utilizes a cryptographic signing application (see, "other program modules" 118) to package an executable file with its corresponding partial image hashes 108 into a self-signed file 122. In this implementation, the self signed file is in a PKCS#7 data format, allowing an end-user to trace an associated signature and X.509 certificate to an ultimate certificate authority. In one implementation, self-signed file 122 includes partial image hashes 108 and a full executable file hash; the full executable file hash being for backward compatibility with conventional code integrity infrastructure.

Exemplary Executable File Integrity Validation

Regardless of how system 100 associates the partial image hashes 108 with a corresponding executable file (e.g., associating an executable file with its partial image hashes 108 into system catalog 120 or a self-signed file 122), such association allows image portion integrity validation module 112 to perform executable file validation during code loading operations with minimal resource and performance impact. This is because, as individual portions of the executable file are copied from a storage device into memory during paging (or portion loading) operations for subsequent execution, respective ones of partial image hashes 108 associated with the individual portions are used to validate individual portions. (Exemplary RAM, ROM, and storage devices such as a disk drive, CD-ROM, DVD, etc. are shown and described below in reference to FIG. 3). As described below, this is accomplished independent of any need to pull in extraneous/additional code and resources (e.g., pages or script) into memory.

File system 116, memory manager 124, and image portion integrity validation module 112 cooperate during operating system (OS) paging (or portion loading) operations to validate portions of an executable file that are being pulled into memory for execution. (In one implementation, the memory manager and the file system are implemented as respective parts of an operating system). To these ends, when executing code (see, "other program modules" 118) wants to load a portion of an executable file that is stored on a storage device for subsequent execution, memory manager 124 sends an open request to file system 116 to open the executable file as part of a section creation process. Subsequently, memory manager communicates one or more in-page (or in-portion) requests to the file system 116 to page or map one or more pages of an executable file into memory for execution. For purposes of discussion, during paging operations, an "in-portion request" is an in-page request. In another implementation, an "in-portion request" is a request for some other number of bytes not delineated by a page boundary, but rather delineated by the code loading architecture being implemented (e.g., scripting engine loading architectures, etc.). Open, in-page requests, and in-portion requests are shown as respective portions of "other data" 114.

To verify the integrity of these one or more portions of code prior to execution of the code, executable file portion integrity validation module 112 intercepts such requests. Responsive to receipt of an open file (e.g., a create request), executable file portion integrity validation module 112 evaluates the source of the data (target) identified by the open request to determine if the target is data or code. Data is typically not mapped as code, and vice versa. If the target is to be mapped as code, executable file portion integrity validation module 112 locates the partial image hashes 108 associated with the target, and maps each of the hashes into memory. In one implementation, this is accomplished by determining whether the partial image hashes are packaged in system catalog 120, or in a self-signed file 122. To accomplish this, executable file portion integrity validation module 112 first computes a hash of the executable file's header using the same algorithm used by per-portion executable file hashing module 110 to create the partial image hashes 108. The computed hash is of the same configurable byte size as each of the partial image hashes 108. For purposes of illustration, this computed hash is shown as a respective one of "hashes computed for verification" in "other data" 114.

Executable file portion integrity validation module 112 compares the computed hash to respective ones of the partial image hashes 108 stored in the system catalog 120 to search for an executable file with an associated partial image hash 108 that matches all bits of the computed hash. If such a matching hash 108 is found, the executable file of interest is "catalog-signed", or represented in the system catalog 120. In this case, executable file portion integrity validation module 112 reads each of the partial image hashes 108 associated with the executable file into RAM. Note that this copy operation is not an integrity-checked paging (or other code portion loading) operation as the list of hashes is data from a non-executable data file and not information being read/paged in from an executable binary.

If the executable file of interest (the target) is not catalog signed, then executable file portion integrity validation module 112 determines if the executable file of interest is self-signed, for example with embedded PKCS#7 signed content. If so, validation filter 112 reads the certificate data, validates that the certificate can ultimately be traced up to one of a set of well-known/trusted certificate roots, and then copies the embedded list of per-page hashes 108 (located in the target's signature) into memory. In one implementation, the self-singed file also includes a full hash of the executable, for performing conventional code integrity checks.

Responsive to intercepting, by executable file portion integrity validation module 112, an "in-portion" request communicated by memory manager 124 to file system 116 for one or more portions of an executable file, wherein the executable file was the subject of a previous open file request, executable file portion integrity validation module 112 validates the integrity of each portion of the requested one or more portions. More particularly, executable file portion integrity validation module 112 computes a hash for each page/portion identified by the in-page/in-portion request and compares each respective hash with the previously-computed and corresponding partial image hash 108 of that portion. (The partial image hashes 108 were copied to memory responsive to an open file request, as described above).

If the computed and stored hashes match, executable file portion integrity validation module 112 allows the in-page/in-portion operation to complete, resulting in the requested portion being mapped to memory for execution. If the computed hash and the corresponding partial image hash 108 do not match, executable file portion integrity validation module 112 fails the in-page/in-portion request and the modified/corrupted/tampered code is not pulled into memory as code, and therefore, is not subsequently executed.

In view of the above, as system 100 implements paging and other memory code loading operations to pull a portion (e.g., a page) of an executable file into memory from a storage device, system 100 checks the integrity of only that portion of code being pulled in. This results in very little resource or performance impact, since only the portion is validated without loading any additional/extraneous portions of the executable file (e.g., the entire executable file).

An Exemplary Procedure

Figure 2:
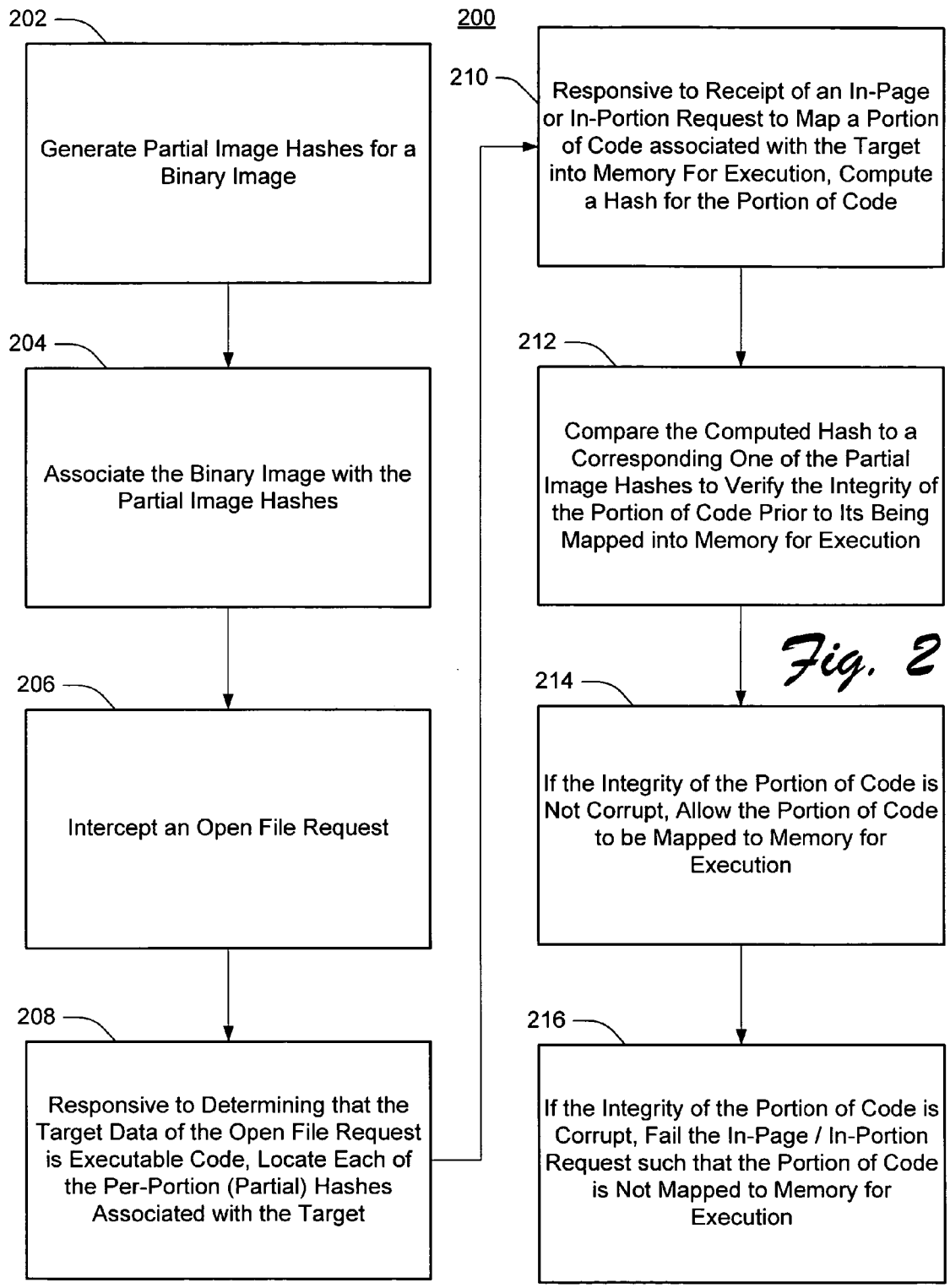
FIG. 2 shows an exemplary procedure to validate executable file integrity using partial hashes.

FIG. 2 shows an exemplary procedure 200 for validating executable file integrity using partial hashes. For purposes of discussion and illustration, operations of the procedure are described with respect to components of FIG. 1. The left-most digit of a component reference number identifies the particular figure in which the component first appears. At block 202, per-portion executable file hashing module 110 (FIG. 1) generates partial image hashes 108 for an executable file. At block 204, the partial image hashes 108 are associated with the executable file. In one implementation, this is accomplished by encapsulating the executable file and the partial image hashes 108 into a system catalog 120. In another implementation, this is accomplished by encapsulating the executable file and the partial image hashes 108 into a self-singed file 122. The system catalog 120 and/or the self signed file 122 may be installed or downloaded onto a different computing device.

At block 206, image portion integrity validation module 112 (FIG. 1) intercepts a file open (create section) request from memory manager 124 to file system 116. At block 208, and responsive to receipt of the file open request, image portion integrity validation module 112 evaluates the target data source of the request to determine whether it is code (an executable file) or data (not an executable file). If the target is an executable file, image portion integrity validation module 112 locates each partial image hash 108 associated with the target and copies them into memory for quick access (e.g., access when an in-page request is received associated with one or more of the partial image hashes 108). At block 210, responsive to intercepting an in-page or in-portion request directed by memory manager 124 to file system 116, image portion integrity validation module 112 computes a hash (computed hash for validation) for that portion of code targeted by the intercepted request. The portion of code was pulled off a data storage location by the file system for pulling into memory for execution—if the portion is subsequently validated as not being corrupt.

To this end, and at block 212, image portion integrity validation module 112 compares the computed hash to the corresponding one partial image hash 108 to verify the integrity of the portion of code requested via the intercepted request (block 210). At block 214, if the portion of code is determined not to be corrupt (i.e., the computed hash matches the corresponding one partial image hash 108), image portion integrity validation module 112 allows the portion of code to be mapped into memory during the paging operations for subsequent execution. Otherwise, at block 216, if the portion of code is determined to be corrupt (i.e. the computed hash does not match the corresponding one partial image hash 108), image portion integrity validation module 112 fails the intercepted request such that the portion of code is not mapped into memory for execution.

An Exemplary Operating Environment

Figure 3:
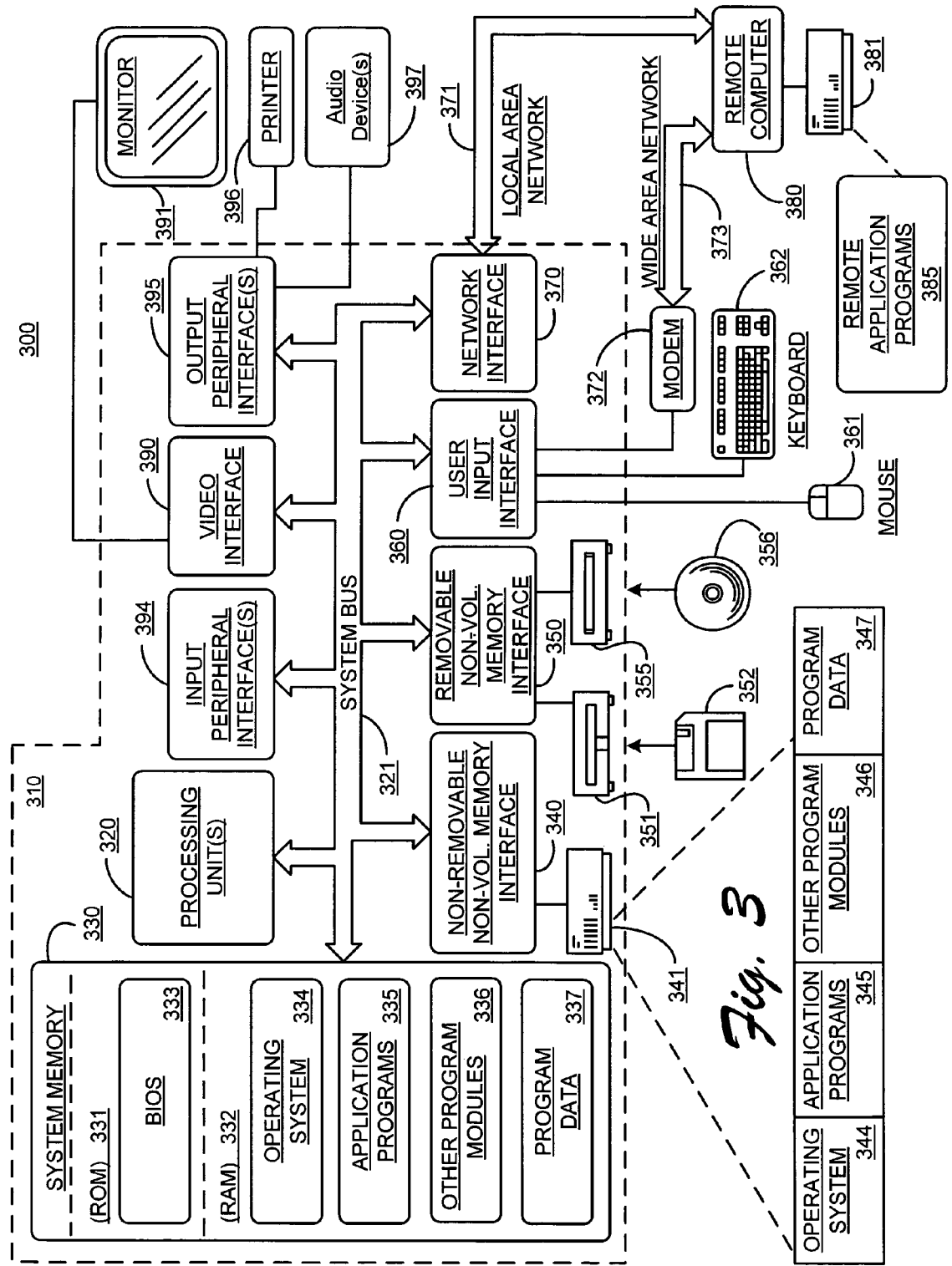
FIG. 3 shows an example of a suitable computing environment in which systems and methods to validate executable file integrity using partial hashes may be fully or partially implemented.

FIG. 3 illustrates an example of a suitable computing environment 300 in which the systems and methods for validating executable file integrity using partial hashes may be fully or partially implemented. Exemplary computing environment 300 is only one example of a suitable computing environment for the exemplary system of FIG. 1 and exemplary operations of FIG. 2, and is not intended to suggest any limitation as to the scope of use or functionality of systems and methods the described herein. Neither should computing environment 300 be interpreted as having any dependency or requirement relating to any one or combination of components illustrated in computing environment 300.

The methods and systems described herein are operational with numerous other general purpose or special purpose computing system, environments or configurations. Examples of well-known computing systems, environments, and/or configurations that may be suitable for use include, but are not limited to, personal computers, laptops, small form factor mobile computing device (e.g., a cellular phone, personal digital assistant, or handheld computer), server computers, multiprocessor systems, microprocessor-based systems, network PCs, minicomputers, mainframe computers, distributed computing environments that include any of the above systems or devices, and so on. Compact or subset versions of the framework may also be implemented in clients of limited resources, such as handheld computers, or other computing devices. The invention is practiced in a distributed computing environment where tasks are performed by remote processing devices that are linked through a communications network. In a distributed computing environment, program modules may be located in both local and remote memory storage devices.

With reference to FIG. 3, an exemplary system 300 illustrates an example of a suitable computing environment in which systems and methods for validating executable file integrity using partial hashes may be fully or partially implemented. System 300 includes a general purpose computing device in the form of a computer 310 implementing, for example, client computer 102 of FIG. 1. Components of computer 310 may include, but are not limited to, processing unit(s) 320, a system memory 330, and a system bus 321 that couples various system components including the system memory to the processing unit 320. The system bus 321 may be any of several types of bus structures including a memory bus or memory controller, a peripheral bus, and a local bus using any of a variety of bus architectures. By way of example and not limitation, such architectures may include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

A computer 310 typically includes a variety of computer-readable media. Computer-readable media can be any available media that can be accessed by computer 310 and includes both volatile and nonvolatile media, removable and non-removable media. By way of example, and not limitation, computer-readable media may comprise computer storage media and communication media. Computer storage media includes volatile and nonvolatile, removable and non-removable media implemented in any method or technology for storage of information such as computer-readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computer 310.

Communication media typically embodies computer-readable instructions, data structures, program modules or other data in a modulated data signal such as a carrier wave or other transport mechanism, and includes any information delivery media. The term "modulated data signal" means a signal that has one or more of its characteristics set or changed in such a manner as to encode information in the signal. By way of example and not limitation, communication media includes wired media such as a wired network or a direct-wired connection, and wireless media such as acoustic, RF, infrared and other wireless media. Combinations of the any of the above should also be included within the scope of computer-readable media.

System memory 330 includes computer storage media in the form of volatile and/or nonvolatile memory such as read only memory (ROM) 331 and random access memory (RAM) 332. A basic input/output system 333 (BIOS), containing the basic routines that help to transfer information between elements within computer 310, such as during start-up, is typically stored in ROM 331. RAM 332 typically contains data and/or program modules that are immediately accessible to and/or presently being operated on by processing unit 320. By way of example and not limitation, FIG. 1 illustrates operating system 334, application programs 335, other program modules 336, and program data 337.

The computer 310 may also include other removable/non-removable, volatile/nonvolatile computer storage media. By way of example only, FIG. 3 illustrates a hard disk drive 341 that reads from or writes to non-removable, nonvolatile magnetic media, a magnetic disk drive 351 that reads from or writes to a removable, nonvolatile magnetic disk 352, and an optical disk drive 355 that reads from or writes to a removable, nonvolatile optical disk 356 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 341 is typically connected to the system bus 321 through a non-removable memory interface such as interface 340, and magnetic disk drive 351 and optical disk drive 355 are typically connected to the system bus 321 by a removable memory interface, such as interface 350.

The drives and their associated computer storage media discussed above and illustrated in FIG. 3, provide storage of computer-readable instructions, data structures, program modules and other data for the computer 310. In FIG. 3, for example, hard disk drive 341 is illustrated as storing operating system 344, application programs 345, other program modules 346, and program data 347. Note that these components can either be the same as or different from operating system 334, application programs 335, other program modules 336, and program data 337. Application programs 335 include, for example, program modules 104 of FIG. 1. Program data 337 includes, for example, program data 106 of FIG. 1. Operating system 344, application programs 345, other program modules 346, and program data 347 are given different numbers here to illustrate that they are at least different copies.

A user may enter commands and information into the computer 310 through input devices such as a keyboard 362 and pointing device 361, commonly referred to as a mouse, trackball or touch pad. Other input devices (not shown) may include a microphone, joystick, game pad, satellite dish, scanner, or the like. These and other input devices are often connected to the processing unit 320 through a user input interface 360 that is coupled to the system bus 321, but may be connected by other interface and bus structures, such as a parallel port, game port or a universal serial bus (USB).

A monitor 391 or other type of display device is also connected to the system bus 321 via an interface, such as a video interface 390. In addition to the monitor, computers may also include other peripheral output devices such as printer 396 and audio devices 397, which may be connected through an output peripheral interface 395.

The computer 310 operates in a networked environment using logical connections to one or more remote computers, such as a remote computer 380. In one implementation, remote computer 380 represents a computing device than installs or downloads an executable file and partial image hashes 108 of FIG. 1 for subsequent per-executable file portion by a local implementation of image portion integrity validation module 112 during code paging operations. The remote computer 380 may be a personal computer, a server, a router, a network PC, a peer device or other common network node, and as a function of its particular implementation, may include many or all of the elements (e.g., program module(s) 104 and program data 106, etc.) described above relative to the computer 102, although only a memory storage device 381 has been illustrated in FIG. 3. The logical connections depicted in FIG. 3 include a local area network (LAN) 371 and a wide area network (WAN) 373, but may also include other networks. Such networking environments are commonplace in offices, enterprise-wide computer networks, intranets and the Internet.

When used in a LAN networking environment, the computer 310 is connected to the LAN 371 through a network interface or adapter 370. When used in a WAN networking environment, the computer 310 typically includes a modem 372 or other means for establishing communications over the WAN 373, such as the Internet. The modem 372, which may be internal or external, may be connected to the system bus 321 via the user input interface 360, or other appropriate mechanism. In a networked environment, program modules depicted relative to the computer 310, or portions thereof, may be stored in the remote memory storage device. By way of example and not limitation, FIG. 3 illustrates remote application programs 385 as residing on memory device 381. The network connections shown are exemplary and other means of establishing a communications link between the computers may be used.

CONCLUSION

Although the systems and methods for validating executable file integrity using partial hashes have been described in language specific to structural features and/or methodological operations or actions, it is understood that the implementations defined in the appended claims are not necessarily limited to the specific features or actions described. For example, although image portion integrity validation module 112 is shown as being incorporated as a plug-in into file system 116, program module 112 could also be a plug-in, or otherwise incorporated, into a program module other than the file system. For instance, in one implementation, operations of image portion integrity validation module 112 are directly accessed (as a plug-in or otherwise) by memory manager 124. Accordingly, the specific features and operations are disclosed as exemplary forms of implementing the claimed subject matter.

The invention claimed is:

1. A computer-implemented method having instructions executable by a processor, comprising:
   generating multiple partial image hashes by the processor of a computing device, wherein the multiple partial image hashes represent an executable file, each partial hash of the multiple partial image hashes representing an arbitrary number of bytes that is less than all of the bytes of the executable file;
   associating the executable file with corresponding partial image hashes on the computing device, wherein the corresponding partial image hashes are encapsulated into a system catalog by utilizing a make or update system catalog application to package the executable file and the corresponding partial image hashes into the system catalog, wherein the system catalog is a part of an operating system and the system catalog is implemented in a nonconventional system catalog, wherein the nonconventional system catalog comprises partial image hashes of an executable file;
   intercepting a file open request from a memory manager to open the executable file;
   locating one or more partial image hashes associated with the executable file and mapping one or more associated partial image hashes into a memory of the computing device, wherein the one or more associated partial image hashes are located after computing a hash of a header of the executable file and comparing a computed hash of the header with corresponding partial image hashes stored in the system catalog, determining that the executable file is represented in the system catalog;
   intercepting a request to page a portion of the executable file into the memory for execution subsequent to loading the executable file, wherein the portion of the executable file indicates an arbitrary number of bytes corresponding to a particular code-to-memory loading operation being performed; and
   responsive to intercepting the request, and prior to paging the portion of the executable file into memory for execution:
      computing a validation hash of the portion of the executable file; and
      comparing the validation hash of the portion of the executable file to a partial hash of the multiple partial image hashes to determine a code integrity of the portion of the executable file, the partial hash representing a same code segment as the portion of the executable file.

2. A method as recited in claim 1, wherein the multiple partial image hashes are calculated prior to loading the executable file onto the computing device.

3. A method as recited in claim 1, and further comprising:
   determining that the validation hash matches the partial hash; and
   responsive to the determining, paging the portion into memory for execution.

4. A method as recited in claim 1, and further comprising:
   determining that the validation hash does not match the partial hash; and
   responsive to the determining, failing the request to page the portion into memory for execution.

5. A method as recited in claim 1, and further comprising:
   subsequent to loading the executable file on a computing device, intercepting an open request to create a code segment for the executable file; and
   responsive to intercepting the open request:
      computing an identifying hash of a header of the executable file;
      comparing the identifying hash to respective ones of a plurality of partial executable file hashes stored in a system catalog to identify a hash of the plurality of partial binary hashes that matches the header, the hash being a first hash of the multiple partial image hashes; and
   responsive to locating the hash, copying the multiple partial image hashes of the executable file out of the system catalog into memory for subsequent partial image hash code integrity validation operations responsive to paging one or more parts of the executable file into memory for execution.

6. A method as recited in claim 1, and further comprising:
   subsequent to loading the executable file on a computing device, intercepting an open request to create a code segment for the executable file; and
   responsive to intercepting the open request, and responsive to determining that the executable file is a self-signed cryptographic file, copying the multiple partial image hashes out of the self-signed cryptographic file into memory for subsequent partial image hash code integrity validation operations responsive to paging one or more parts of the executable file into memory for execution.

7. A computer-readable storage medium embodied with computer-program instructions executable by a processor to perform acts, comprising:
   generating multiple partial image hashes on a computing device, wherein the multiple partial image hashes represent a digest of an executable file, each partial hash of the multiple partial image hashes representing an arbitrary number of bytes that is less than all of the bytes of the executable file;
   associating the executable file with corresponding partial image hashes on the computing device, wherein the corresponding partial image hashes are encapsulated into a system catalog by utilizing a make or update system catalog application to package the executable file and the corresponding partial image hashes into the system catalog, wherein the system catalog is a part of an operating system and the system catalog is implemented in a nonconventional system catalog, wherein the nonconventional system catalog comprises partial image hashes of an executable file;
   intercepting a file open request from a memory manager to open the executable file;

locating one or more partial image hashes associated with the executable file and mapping one or more associated partial image hashes into memory of the computing device, wherein associated partial image hashes are located after computing a hash of a header of the executable file and comparing a computed hash of the header with corresponding partial image hashes stored in the system catalog, determining that the executable file is represented in the system catalog;

intercepting a request to page a portion of the executable file into memory for execution, subsequent to loading the executable file on the computing device, wherein the portion of the executable file indicates an arbitrary number of bytes appropriate to a particular code-to-memory loading operation being performed; and responsive to intercepting the request, and prior to paging the portion of the executable file into memory for execution:

computing a validation hash of the portion of the executable file; and comparing the validation hash of the portion of the executable file to a partial hash of the multiple partial image hashes to determine a code integrity of the portion of the executable file, the partial hash representing a same code segment as the portion of the executable file.

8. A computer-readable storage medium as recited in claim 7, wherein the multiple partial image hashes are calculated prior to loading the executable file onto the computing device.

9. A computer-readable storage medium as recited in claim 7, wherein the computer-program instructions further comprise instructions for:

determining that the validation hash matches the partial hash; and responsive to the determining, paging the portion into memory for execution.

10. A computer-readable storage medium as recited in claim 7, wherein the computer-program instructions further comprise instructions for:

determining that the validation hash does not match the partial hash; and responsive to the determining, failing the request to page the portion into memory for execution.

11. A computer-readable storage medium as recited in claim 7, wherein the computer-program instructions further comprise instructions for:

subsequent to loading the executable file on a computing device, intercepting an open request to create a code segment for the executable file; and responsive to intercepting the open request:

computing an identifying hash of a header of the executable file;

comparing the identifying hash to respective ones of a plurality of partial executable file hashes stored in a system catalog to identify a hash of the plurality of partial binary hashes that matches the header, the hash being a first hash of the multiple partial image hashes; and responsive to locating the hash, copying the multiple partial image hashes of the executable file out of the system catalog into memory for subsequent partial image hash code integrity validation operations responsive to paging one or more parts of the executable file into memory for execution.

12. A computer-readable storage medium as recited in claim 7, wherein the computer-program instructions farther comprise instructions for:

subsequent to loading the executable file on a computing device, intercepting an open request to create a code segment for the executable file; and responsive to intercepting the open request, and responsive to determining that the executable file is a self-signed cryptographic file, copying the multiple partial image hashes out of the self signed cryptographic file into memory for subsequent partial image hash code integrity validation operations responsive to paging one or more parts of the executable file into memory for execution.

13. A computing device comprising:

a processor; and a memory coupled to the processor, the memory comprising computer-program instructions executable by the processor for:

generating multiple partial image hashes by the processor of a computing device, wherein the multiple partial image hashes represent a digest of an executable file, each partial hash of the multiple partial image hashes representing an arbitrary number of bytes that is less than all of the bytes of the executable file;

associating the executable file with corresponding partial image hashes on the computing device, wherein the corresponding partial image hashes are encapsulated into a system catalog by utilizing a make or update system catalog application to package the executable file and the corresponding partial image hashes into the system catalog, wherein the system catalog is a part of an operating system and the system catalog is implemented in a nonconventional system catalog, wherein the nonconventional system catalog comprises partial image hashes of an executable file;

intercepting a file open request from a memory manager to open the executable file;

locating one or more partial image hashes associated with the executable file and mapping one or more associated partial image hashes into memory of the computing device, wherein associated partial image hashes are located after computing a hash of a header of the executable file and comparing a computed hash of the header with corresponding partial image hashes stored in the system catalog, determining that the executable file is represented in the system catalog;

subsequent to loading the executable file on a computing device, intercepting a request to page a portion of the executable file into memory for execution, wherein the portion of the executable file indicates an arbitrary number of bytes corresponding to a particular code-to-memory loading operation being performed; and responsive to intercepting the request, and prior to paging the portion of the executable file into memory for execution:

computing a validation hash of the portion of the executable file; and comparing the validation hash of the portion of the executable file to a partial hash of the multiple partial image hashes to determine a code integrity of the portion of the executable file, the partial hash representing a same code segment as the portion of the executable file.

14. A computing device as recited in claim 13, wherein the computer-program instructions further comprise instructions for:

determining that the validation hash matches the partial hash; and responsive to the determining, paging the portion into memory for execution.

15. A computing device as recited in claim 13, wherein the computer-program instructions further comprise instructions for:
- determining that the validation hash does not match the partial hash; and
- responsive to the determining, failing the request to page the portion into memory for execution.

16. A computing device as recited in claim 13, wherein the computer-program instructions further comprise instructions for:
- subsequent to loading the executable file on a computing device, intercepting an open request to create a code segment for the executable file; and
- responsive to intercepting the open request:
  - computing an identifying hash of a header of the executable file;
  - comparing the identifying hash to respective ones of a plurality of partial executable file hashes stored in a system catalog to identify a hash of the plurality of partial binary hashes that matches the header, the hash being a first hash of the multiple partial image hashes; and
  - responsive to locating the hash, copying the multiple partial image hashes of the executable file out of the system catalog into memory for subsequent partial image hash code integrity validation operations responsive to paging one or more parts of the executable file into memory for execution.

17. A computing device as recited in claim 13, wherein the computer-program instructions further comprise instructions for:
- subsequent to loading the executable file on a computing device, intercepting an open request to create a code segment for the executable file; and
- responsive to intercepting the open request, and responsive to determining that the executable file is a self-signed cryptographic file, copying the multiple partial image hashes out of the self-signed cryptographic file into memory for subsequent partial image hash code integrity validation operations responsive to paging one or more parts of the executable file into memory for execution.

* * * * *